United States Patent [19]
Heuer

[11] Patent Number: 5,544,483
[45] Date of Patent: Aug. 13, 1996

[54] INTERNAL COMBUSTION ENGINE WITH A SECONDARY AIR-FUEL SUPPLY

[75] Inventor: Karsten Heuer, Wasbüttel, Germany

[73] Assignee: Volkswagen AG, Wolfsburg 1, Germany

[21] Appl. No.: 187,649

[22] Filed: Jan. 27, 1994

[30] Foreign Application Priority Data

Feb. 19, 1993 [DE] Germany .......................... 43 05 151.0

[51] Int. Cl.$^6$ ..................................... F01N 3/36
[52] U.S. Cl. ............................. 60/283; 60/284; 60/289; 60/303; 60/307
[58] Field of Search .......................... 60/283, 285, 286, 60/287, 289, 307, 308, 303, 284

[56] References Cited

U.S. PATENT DOCUMENTS

| | | | |
|---|---|---|---|
| 3,050,376 | 8/1962 | Bishop | 60/283 |
| 3,131,533 | 5/1964 | Vandenberg | 60/283 |
| 3,263,412 | 8/1966 | Thompson | 60/283 |
| 3,306,035 | 2/1967 | Morrell | 60/283 |
| 3,446,011 | 5/1969 | Ohno | 60/283 |
| 3,618,314 | 11/1971 | Krebs | 60/283 |
| 3,716,996 | 2/1973 | Maruoka | 60/303 |
| 3,908,371 | 9/1975 | Nagai | 60/286 |
| 3,911,675 | 10/1975 | Mondt | 60/283 |
| 4,926,816 | 5/1990 | Kita et al. | 123/203 |
| 5,239,824 | 8/1993 | Matsumoto | 60/283 |
| 5,272,873 | 12/1993 | Hamazaki | 60/283 |
| 5,353,590 | 10/1994 | Pettit et al. | 60/283 |

FOREIGN PATENT DOCUMENTS

| | | | |
|---|---|---|---|
| 3935612 | 10/1989 | Germany . | |
| 562956 | 6/1975 | Switzerland | 60/283 |

*Primary Examiner*—Leonard E. Heyman
*Attorney, Agent, or Firm*—Brumbaugh, Graves, Donohue & Raymond

[57] ABSTRACT

An internal combustion engine has a temperature-dependent exhaust gas converter arranged to receive a secondary air supply from a secondary air pump, and the engine has a fuel vapor accumulator to collect fuel vapors from the fuel supply for the engine. During cold-starting of the engine, the air pump is operated to draw fuel vapors from the accumulator into the secondary air supply to regenerate the accumulator and provide a flammable secondary air-fuel mixture to the exhaust gas converter.

3 Claims, 1 Drawing Sheet

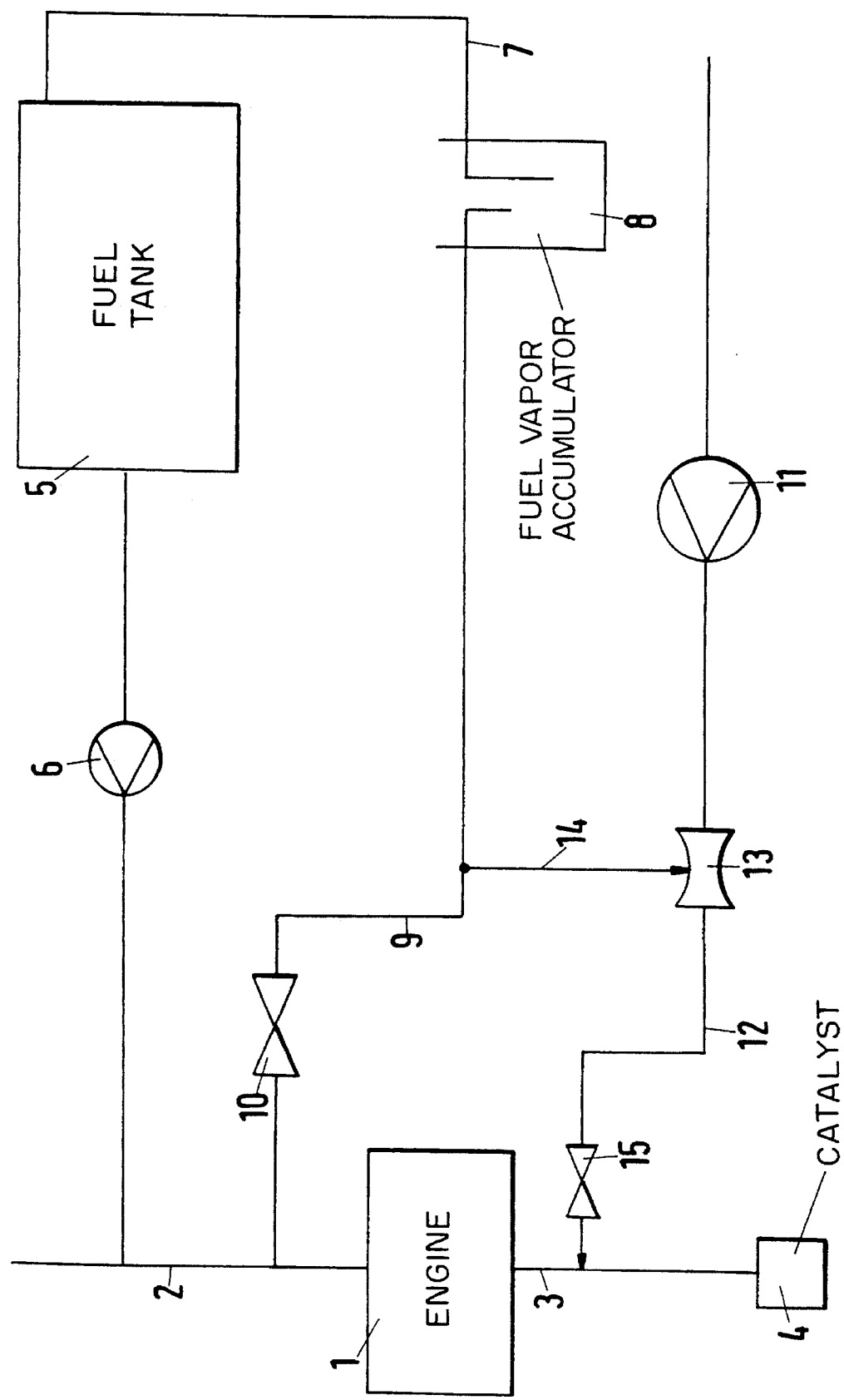

INTERNAL COMBUSTION ENGINE WITH A SECONDARY AIR-FUEL SUPPLY

BACKGROUND OF THE INVENTION

This invention relates to internal combustion engines having an exhaust gas converter with a secondary air-fuel supply.

U.S. Pat. No. 4,926,816 discloses a rotary piston engine having a secondary air supply selectively connectable to the combustion chamber exhaust port or to the exhaust gas converter. According to that patent, secondary air or an air-fuel mixture may be directed to the combustion chamber exhaust port at low engine speeds. At intermediate speeds, secondary air is directed to the exhaust gas converter, and at higher speeds no secondary air is supplied to either location.

German Offenlegungsschrift No. 39 35 612 discloses accumulators of the activated-carbon filter type for collecting fuel vapors formed in components of the fuel supply for an internal combustion engine, particularly the fuel tank or a carburetor, so as to prevent the vapors from escaping into the atmosphere. In view of the limited storage capacity of such fuel vapor accumulators, and to make use of the collected fuel vapors, regeneration of the filters takes place during operation of the internal combustion engine by connecting them to a suction line leading to the intake system of the engine. In this way, the accumulated fuel vapors are drawn into the combustion chambers of the engine and consumed in accordance with environmental regulations. Alternatively, as described in the same prior art document, air pumps driven by the engine may also be used for this purpose.

SUMMARY OF THE INVENTION

Accordingly, it is an object of the present invention to provide an internal combustion engine having an exhaust gas converter with a secondary air-fuel supply which overcomes the disadvantages of the prior art.

Another object of the invention is to provide an internal combustion engine in which, with the least possible additional expenditure, the effectiveness of a temperature-dependent exhaust gas converter is accelerated upon cold-start of the engine.

These and other objects of the invention are attained by providing an internal combustion engine having an exhaust gas converter and a fuel vapor accumulator for accumulating fuel vapor from the fuel supply system along with an air pump for drawing fuel vapor from the accumulator and supplying a secondary fuel-air mixture to the exhaust gas converter during cold-start.

Thus, during cold-start of the engine, which is critical with regard to exhaust gas purification and commencement of combustion processes in the combustion chambers of the engine, the invention advantageously uses the fuel vapors accumulated in, for example, an activated-carbon filter for formation of the secondary air-fuel mixture which is supplied by the pump to increase the energy content of the exhaust gases. Overenrichment of the fuel-air mixture present in the combustion chambers of the engine resulting from supply of the accumulated fuel vapors to the engine is thereby prevented.

According to one embodiment, the accumulated fuel vapors are withdrawn indirectly by the pump, which operates as a clean-air pump. Alternatively, the fuel vapors may be withdrawn from the accumulator using negative pressure in the intake system of the engine.

BRIEF DESCRIPTION OF THE DRAWING

Further objects and advantages of the invention will be apparent from a reading of the following description in conjunction with the accompanying drawing, which is a schematic block diagram illustrating a representative internal combustion engine with an exhaust gas converter having a secondary fuel-air supply arranged in accordance with the invention.

DESCRIPTION OF PREFERRED EMBODIMENT

In the typical embodiment of the invention shown in the drawing, an internal combustion engine 1 has a fuel-air intake system 2 and an exhaust gas system 3. The exhaust gas system has a catalyst arrangement 4, which is of conventional design and therefore will not be described in detail, arranged to remove or convert carbon monoxide, nitrogen oxide and hydrocarbons in the exhaust gas.

The engine 1 is supplied with fuel from a fuel tank 5 by a fuel pump 6, which is also of conventional design. Fuel vapors formed above the fuel level in the fuel tank 5 are conveyed through a line 7 to an activated-carbon filter 8 where they are collected to avoid release into the atmosphere. The activated-carbon filter 8 is connected through a venting line 9 having a tank-venting valve 10 with a negative-pressure region of the intake system 2 of the engine 1.

As is well known, the filter 8 may be regenerated in this way so that, upon renewed fuel vapor formation in the fuel tank 5 or in some other component of the fuel supply system for the engine 1, it is able to absorb the fuel vapor and prevent its escape into the atmosphere.

To accelerate heating of the catalyst 4 to its operating temperature upon cold-start of the engine 1 in accordance with the invention, secondary air is supplied to the catalyst by a secondary air pump 11, which may be mechanically or electrically driven, through a line 12. The line 12 has a venturi 13 located downstream from the pump 11 and a branch line 14 leading from the venting line 9 upstream of the tank-venting valve 10 which conducts fuel vapors from the line 9 into the venturi. Because of the reduced pressure in the branch 14 produced by the venturi 13 by the flow of air therein from the air pump 11, the fuel vapors drawn from the filter 8 are supplied to the secondary air conveyed by the pump 11 so that a flammable fuel-air mixture is supplied to the intake of the catalyst 4.

This supply of fuel to the catalyst 4 may be terminated when the catalyst reaches its operating temperature by opening the tank-venting valve 10, optionally together with stopping of the air pump 11 and closing of a valve 15 in the line 12. In this condition, all accumulated fuel vapors will be supplied through the line 9 to the intake system 2 of the engine 1.

Accordingly, the invention provides a reduction in the response time of the catalyst and avoids adverse effects on cold-start of the engine by recycling fuel vapors with minimal additional expenditure.

Although the invention has been described herein with reference to a specific embodiment, many modifications and variations therein will readily occur to those skilled in the art. Accordingly, all such variations and modifications are included within the intended scope of the invention.

I claim:

1. An internal combustion engine arrangement comprising an internal combustion engine, a catalyst arrangement receiving exhaust gases from the engine to eliminate undesirable exhaust gas components, a fuel vapor accumulator for accumulating fuel vapor from a fuel supply system for the engine, and a secondary air supply for supplying secondary air to the catalyst arrangement including a pump and valve means for causing fuel vapor from the accumulator to be drawn into the secondary air supply for the catalyst arrangement during cold-starting of the engine to increase the energy content of the exhaust gases to accelerate the effectiveness of the catalyst arrangement.

2. An internal combustion engine arrangement according to claim 1 wherein the pump is an air pump and including a venturi disposed in an air leading from the air pump to the exhaust gas converter to draw fuel vapors from the accomulator into the line.

3. An internal combustion engine arrangement comprising an internal combustion engine, an exhaust gas converter receiving exhaust gases from the engine to eliminate undesirable exhaust gas components, a fuel vapor accumulator for accumulating fuel vapor from a fuel supply system for the engine, and a secondary air supply for supplying secondary air to the exhaust gas converter including a pump and valve means for causing fuel vapor from the accumulator to be drawn into the secondary air supply for the exhaust gas converter during cold-starting of the engine wherein the pump is an air pump and including a venturi disposed in an air line leading from the air pump to the exhaust gas converter to draw fuel vapors from the accumulators into the air line and including a fuel vapor line having a venting valve leading from the accumulator to an intake system for the engine and a branch line connecting the venturi to the fuel vapor line at a location upstream of the venting valve.

* * * * *

UNITED STATES PATENT AND TRADEMARK OFFICE
CERTIFICATE OF CORRECTION

PATENT NO. : 5,544,483

DATED : August 13, 1996

INVENTOR(S) : Karsten Heuer

It is certified that error appears in the above-indentified patent and that said Letters Patent is hereby corrected as shown below:

Title page, Item 54, AND Column 1, line 1, "ENGINE" should read --ENGINE HAVING AN EXHAUST GAS CONVERTER--;

Column 3, lines 17-18, "accomulator into the line" should read --accumulator into the air line--.

Signed and Sealed this

Twenty-fifth Day of February, 1997

Attest:

BRUCE LEHMAN

Attesting Officer

Commissioner of Patents and Trademarks